Patented June 18, 1946

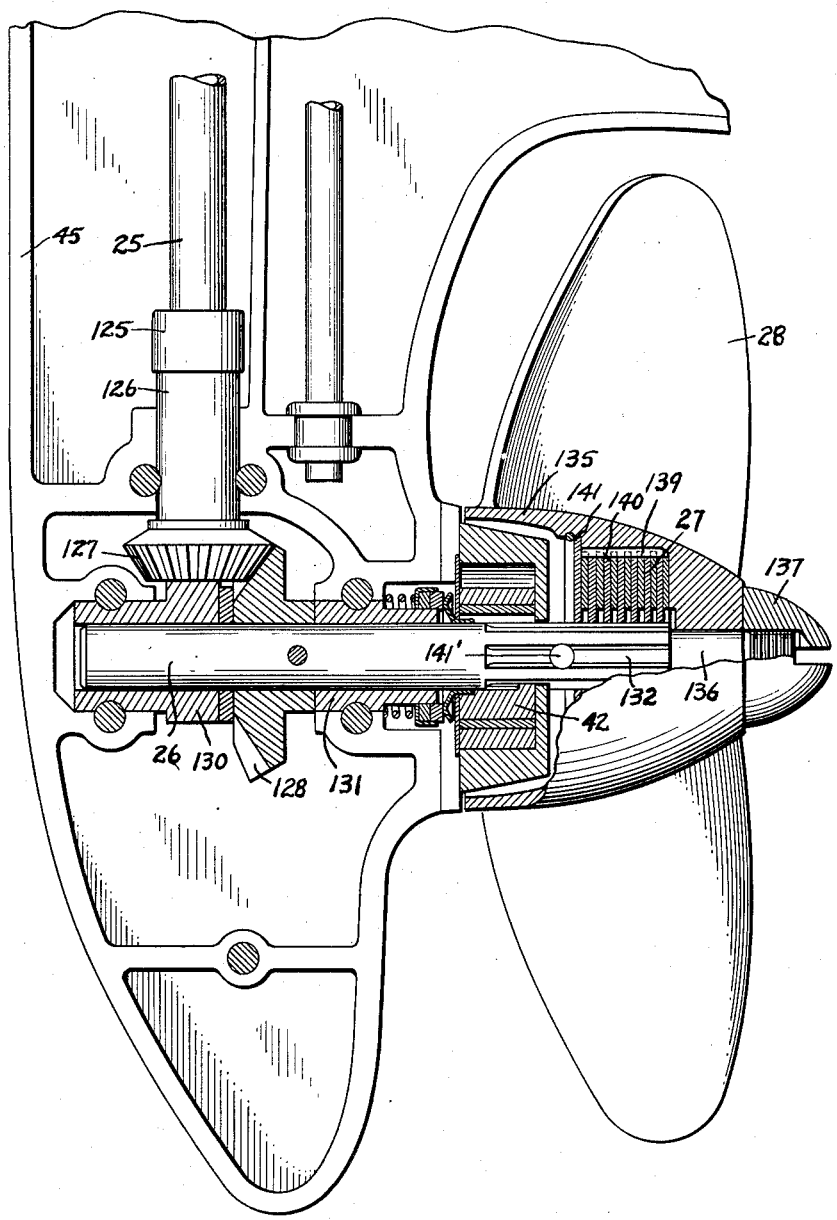

2,402,197

UNITED STATES PATENT OFFICE 2,402,197

MARINE PROPELLER DRIVE

Leo T. Kincannon, Milwaukee, Wis., assignor to Metal Products Corporation, Milwaukee, Wis., a corporation of Wisconsin Original application April 14, 1943, Serial No. 482,967. Divided and this application July 15, 1944, Serial No. 545,137

2 Claims. (Cl. 115—34)

This invention relates to boat propulsion and more particularly to outboard motors to propel rowboats, speed boats, and other light crafts.

This application is a division of my copending application Serial No. 482,967, filed April 14, 1943, and relates more particularly to the propeller drive shown, described, and claimed in said application, and the object of this invention is to provide a propeller drive including a clutch mechanism which will release freely should the propeller strike an obstacle.

The invention further consists in the several features hereinafter set forth and more particularly defined by claims at the conclusion hereof.

The drawing is an enlarged longitudinal view of the propeller and drive shaft, and shows details of the clutch release mechanism, parts being broken away and parts being shown in section.

In the drawing, the lower end of the motor drive shaft 25 passes through a packing 125 and through a bearing 126 mounted in the drive shaft housing 45. The lower end of the drive shaft 25 is provided with bevel pinion 127 which meshes wit' a bevel gear 128 which is fixed on the propeller shaft 26. The propeller shaft 26 is mounted in a pair of bearings 130—131 in the housing 45, and projects therefrom and terminates in a spline end 132.

Immediately past the bearing 131 is the water pump 42 heretofore mentioned, which is of the oscillating type (not shown in detail herein) and is designed with a side intake and outlet to facilitate streamlining and prevent the bulge on the shaft housing usually obtained in such pumps.

The propeller 28 is constructed on the exterior of a hub 135 which is mounted on a stub extension 136 of the shaft 26 beyond the spline 132, and is secured thereon by a nut 137. The hub 135 has an interior cavity, a portion of which extends over and encloses the pump 42. The innermost portion of the cavity is splined to receive alternate discs 139 of a clutch. Mating discs 140 are retained on the splined end of the shaft 132 so that pressure created by the propeller 28 compresses the discs against each other and against a plate 141 and pin 141' and forms a drive for the propeller. The clutch is, therefore due to the inherent friction between the disks, engaged by the thrust of the water on the propeller, and any stoppage of the propeller automatically relieves the pressure and disengages the clutch. Should the propeller strike an object, the thrust from the propeller is removed, the clutch disks slip relative to each other, and the propeller is disengaged from the engine, thus avoiding breakage to the engine or propeller. As soon as the propeller is freed from the obstruction, the thrust of the water against the propeller is available with the aid of the friction between the parts to again drive the propeller.

I desire it to be understood that this invention is not to be limited to any particular form or arrangement of parts except in so far as such limitations are included in the appended claims.

What I claim as my invention is:

1. In an outboard motor, the combination of a driven propeller shaft, a propeller mounted for lengthwise movement relative to said shaft, and a clutch connection between said propeller and said propeller shaft including relatively movable members operatively engageable solely by the friction of said members on the lengthwise movement of the propeller by the thrust of the water thereon.

2. In an outboard motor, the combination of a motor driven propeller shaft having a spline end, a propeller mounted on said propeller shaft for lengthwise movement, said propeller comprising a hub having a hollow splined interior and a plurality of blades fixed on the exterior of said hub, a plurality of clutch plates mounted on the splined end of the shaft, a plurality of clutch plates mounted in the spline of the hub and interspersed between the first named clutch plates, said clutch plates on said shaft and said propeller being engageable to establish a driving connection between said propeller and said propeller shaft solely by the friction set up between the clutch plates on the lengthwise movement of the propeller by the thrust of the water thereon, and means on said spline shaft to limit the forward movement of said clutch plates.

LEO T. KINCANNON.